D. Curtis.
Cotton Press.
N°. 100,607. Fig: 1. Patented Mar. 8, 1870.
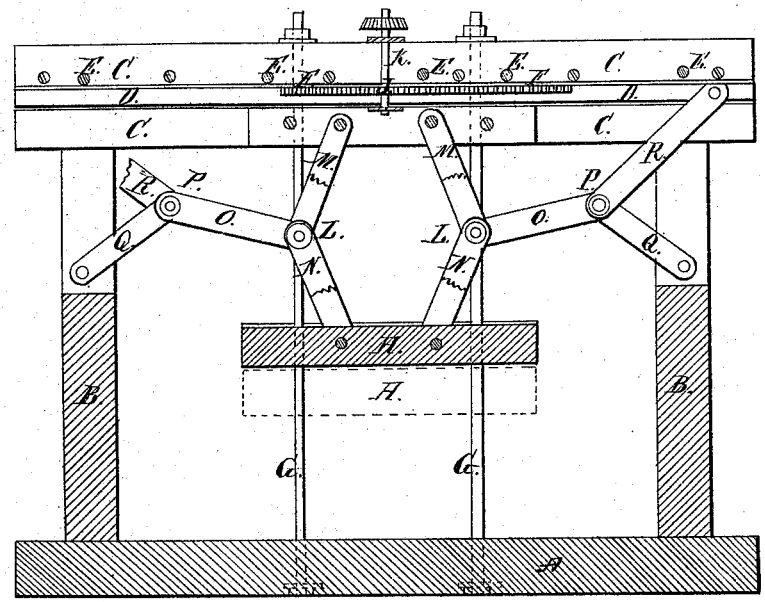
Fig: 2.
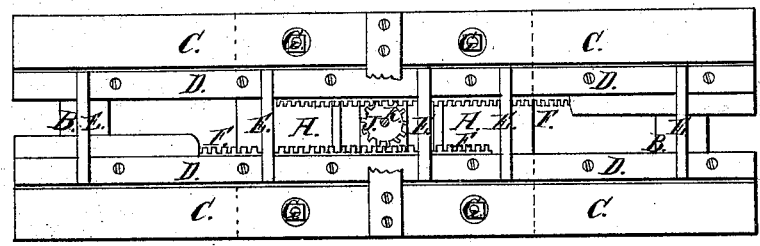
Witnesses:
Chas. T. Wahly
C. B. Delavergne
Inventor:
Dexter Curtis

United States Patent Office.

DEXTER CURTIS, OF MADISON, WISCONSIN.

Letters Patent No. 100,607, dated March 8, 1870; antedated February 26, 1870.

IMPROVEMENT IN PRESSES.

The Schedule referred to in these Letters Patent and making part of the same.

To all whom it may concern:

Be it known that I, DEXTER CURTIS, of Madison, in the county of Dane, and State of Wisconsin, have invented a new and useful Machine for Compressing Oil-Cake, Cotton, Hay, Hops, or any other material requiring great compressure; and I do hereby declare the following to be a full, clear, and exact description of the construction and operation of the same, reference being had to the annexed drawings making a part of this specification, in which—

Figure 1 is a longitudinal section through the center, and

Figure 2 is a plan view.

My invention consists in an improved arrangement, in a machine for compressing hay, cotton, &c., of a series of toggle-levers of peculiar construction, with reference to the follower or platen, the frame of the press, and two racks, operated in opposite directions by a pinion, all as hereinafter more fully described.

To construct my machine, I first make a frame, the bed or bottom-piece of which consists of five or more timbers, twelve by twelve inches, forty feet long, placed in contact, so as to form the bed-piece A.

The uprights B B consist of four timbers, twelve by twelve inches, twenty-four feet long, mortised into the two timbers lying each side of the center timber of the bed-piece A, and also into the top pieces C C, which latter are two timbers, twelve by sixteen inches, forty feet long, the inner sides of which are cut down ten inches deep by six inches thick, and faced with metal, forming grooves, in which are placed the carriage frames D D, consisting of two timbers, six by six inches, twenty-four feet long, faced on each side with metal.

The whole frame is placed upon timbers, to which it is braced for solidity, and is also strengthened by two longitudinal and four vertical timbers, properly mortised and otherwise braced and strengthened, as required.

E E E E are rollers inserted in the top pieces C C, just over the carriage frames D D.

F F are racks twelve feet long, placed on each carriage frame, under the facings, cogs inward.

G G G G are four iron bolts, extending from the bottom to the top, consisting of round three-inch iron, drawn tightly to the timbers, with heads below and nuts above, for the double purpose of strengthening the frame and holding the follower in place.

The follower H is formed of timbers properly framed together, or of iron, and is seven feet long by one and one-half feet thick, by two and one-half feet wide, and is properly bored to receive the rods G G G G.

I make a pinion, J, and place the same upon the shaft K, which turns vertically between the two top pieces, C C, so as to have the cogs of the pinion J mesh with those of each of the racks F F, and give them motion.

About two feet each side of the pinion J, I place a double lever, m m, fastened by a journal to the lower part of the top pieces C C, reaching downward eight feet, where they are placed upon the journals L L, passing through them.

Upon these journals L L also work the double levers N N, extending downward eight feet, and working upon a journal passing through the follower H, forming, with the levers M M, toggle-levers, with their joints at L L.

The single levers O O are connected with the levers M M M M and N N N N at L L, working upon the same journals L L between the said sets of toggle-levers, and extending upward and to the right and left eight feet, where they receive the journals P P, upon which journals, also, work the levers Q Q, also journaled into the uprights B B, and forming, with the levers O O, a second set of toggle-levers.

Upon the journals P P are placed, also, the operating arms R R, ten feet long, attached at the upper end, the one to the front and the other to the rear carriage frame D D, with a bolt or pin, upon which it works as a journal. This arm, with all the levers, is of iron.

The dimensions and form given above are particularly applicable to the compressing of cotton, to be varied for other material as required.

To work my machine, the bale of cotton or other material to be pressed is placed squarely upon the bed A, under the follower H, and steam or other adequate power is applied to the pinion J, which, being turned, drives the racks F F, the one to the right and the other to the left. This brings down the operating arms R R, giving them a more perpendicular position, thus straightening the toggle-levers formed by O O and Q Q, which in turn straighten the toggle-levers formed by M M M M and N N N N, bringing down the follower H, and increasing the power as the same descends, until the maximum of power is reached, when both sets of toggle-levers will be straightened, and the compressing is completed at that point. The power is then reversed, and the follower is raised by the same action reversed.

I do not claim the devices here employed, either by themselves or in any general combination, for I am aware that the same devices, in various combinations, have been used in machines of this class; but What I do claim as new, and desire to secure by Letters Patent, is—

The arrangement herein described of the press-frame, the levers M N O Q R, follower H, sliding racks D, and pinion J, when said parts are constructed, combined together, and operated in the manner and for the purpose herein set forth.

DEXTER CURTIS.

Witnesses:
   CHAS. T. WALESBY,
   GEORGE E. WOODWARD.